(12) United States Patent
Shan et al.

(10) Patent No.: US 9,083,087 B2
(45) Date of Patent: Jul. 14, 2015

(54) ANTENNA SYSTEM SWITCHING METHOD AND MOBILE TERMINAL

(75) Inventors: Wenying Shan, Beijing (CN); Gong Cui, Beijing (CN); Jianjun Zhi, Beijing (CN); Jiangwei Zhong, Beijing (CN)

(73) Assignees: BEIJING LENOVO SAOFTWARE LTD., Beijing (CN); LENOVO (BEIJING CO., LTD., Beijing (CN)

( * ) Notice: Subject to any disclaimer, the term of this patent is extended or adjusted under 35 U.S.C. 154(b) by 264 days.

(21) Appl. No.: 13/807,458

(22) PCT Filed: Jun. 24, 2011

(86) PCT No.: PCT/CN2011/076306
§ 371 (c)(1),
(2), (4) Date: Dec. 28, 2012

(87) PCT Pub. No.: WO2012/000405
PCT Pub. Date: Jan. 5, 2012

(65) Prior Publication Data
US 2013/0106666 A1 May 2, 2013

(30) Foreign Application Priority Data

Jun. 30, 2010 (CN) .......................... 2010 1 0223599

(51) Int. Cl.
*H01Q 1/24* (2006.01)
*H01Q 21/28* (2006.01)
(Continued)

(52) U.S. Cl.
CPC .............. *H01Q 21/28* (2013.01); *H01Q 1/243* (2013.01); *H01Q 1/48* (2013.01); *H04W 24/00* (2013.01); *H04W 88/06* (2013.01)

(58) Field of Classification Search
CPC .......... H01Q 1/243; H01Q 21/28; H01Q 3/24

USPC .................................................. 343/702, 876
See application file for complete search history.

(56) References Cited

U.S. PATENT DOCUMENTS 7,609,212 B2 * 10/2009 Sato et al. ...................... 343/702
7,626,554 B2 * 12/2009 Mashima et al. ............. 343/702
(Continued)

FOREIGN PATENT DOCUMENTS

CN 1747341 3/2006
CN 1841949 10/2006
(Continued)

OTHER PUBLICATIONS

PCT/CN2011/076306 International Preliminary Report on Patentability dated Jan. 8, 2013 (6 pages).
(Continued)

*Primary Examiner* — Hoang V Nguyen
(74) *Attorney, Agent, or Firm* — Brinks Gilson & Lione; G. Peter Nichols (57) ABSTRACT

An antenna system switching method and a mobile terminal is described. The mobile terminal includes a first portion and a second portion, a first antenna system and a second antenna system. The mobile terminal has a first physical status and a second physical status according to the difference of the relative positions of the first portion and the second portion. The mobile terminal operates through the different first antenna system and second antenna system according to the difference of the physical statuses in which it is, so that an antenna ground unit and an antenna radiating unit can be located on different parts of the mobile terminal, the demand for the height of the antenna of the mobile terminal is satisfied while the light and thin of the mobile terminal is implemented.

14 Claims, 4 Drawing Sheets

(51) Int. Cl.
*H01Q 1/48* (2006.01)
*H04W 24/00* (2009.01)
*H04W 88/06* (2009.01)

(56) References Cited

U.S. PATENT DOCUMENTS

| | | | | |
|---|---|---|---|---|
| 7,737,897 | B2* | 6/2010 | Takeuchi et al. | 343/702 |
| 8,154,460 | B2* | 4/2012 | Sakata et al. | 343/702 |
| 2009/0033566 | A1* | 2/2009 | Nakanishi et al. | 343/702 |

FOREIGN PATENT DOCUMENTS

| | | |
|---|---|---|
| CN | 201069869 | 6/2008 |
| CN | 201114213 | 9/2008 |

OTHER PUBLICATIONS

PCT/CN2011/076306 International Search Report dated Oct. 13, 2011 (3 pages).

* cited by examiner

ANTENNA SYSTEM SWITCHING METHOD AND MOBILE TERMINAL

This application claims priority to International Application No. PCT/CN2011/076306 filed on Jun. 24, 2011 and also to Chinese Patent Application No. 201010223599.7 filed on Jun. 30, 2010, the entire contents of each are incorporated herein by reference.

BACKGROUND

This application refers to the field of communication technology, and in particular to an antenna system switching method and a mobile terminal.

Antenna is an important radio equipment transmitting and receiving electromagnetic waves, and is general classified to two kinds of built-in antenna and outlay antenna, the mobile terminal such as a mobile phone mainly uses the built-in antenna in the prior art. For a slide mobile phone, it includes two kinds of physical statuses, which are a close status and an open status respectively, and the antenna needs to reach a certain demand of indices regardless under what kind of status the antenna operates. Wherein, in the close status, since there are keyboard and other circuits as metallic media, it results in an incomplete headroom around the antenna, which influences the performance of the antenna, therefore, a PIFA (the Planer Inverted-F) antenna with respect to ground is employed in the prior art.

In the procedure of research of the prior art, the inventor found that the slide mobile phone in the prior art uses the PIFA antenna in both of the close status and the open status, the radiating unit and the ground plane unit of the antenna are positioned in the upper cover body of the mobile phone, or are positioned in the lower cover body of the mobile phone at the same time. The PIFA antenna is composed of a radiating unit, an antenna feeding point, a ground feeding point and a ground plane unit, the PIFA antenna forms a radiating cavity by the radiating unit and the ground plane unit to radiate signals to space, and in order to reach the radiating performance of the antenna, an antenna space needs to be reserved, and the length, the width and the height of the space need to reach a certain standard. Along with the development of the communication technology, the demand to the frequency band of the terminal is increased increasingly, and the corresponding height of the antenna is higher increasingly, and at the same time, the user wishes the terminal carried to possess a characteristic of being light and thin, therefore, there is a contradiction between the above height of antenna and the lightness and thinness of the terminal. Generally, in order to satisfy the radiant efficiency of the antenna, the thickness of the upper cover body and the lower cover body of the mobile phone needs to be larger than 10 to 11 mm, so that the height of the antenna can satisfy the demand of reaching 8 to 9 mm, and based on the above demand, for the entire mobile phone, the overall thickness thereof would not satisfy the demand of 13 to 14 mm.

SUMMARY OF THE INVENTION

The object of the embodiments of this application is to provide an antenna system switching method and a mobile terminal to solve the problem that the antennas in the prior art are all provided on the same cover body side of the terminal so that the demand of the overall thickness of the terminal cannot be satisfied.

In order to solve the above technical problem, the embodiments of this application provides the following technical solutions:

An antenna system switching method applied to a mobile terminal composed of a first portion and a second portion, the mobile terminal has a first physical status and a second physical status according to the difference of the relative positions of the first portion and the second portion, which characterize in that the mobile terminal comprises a first antenna system and a second antenna system, the method comprises:

Detecting the physical status of the mobile terminal;

When the mobile terminal is in the first physical status, the first antenna system is made to be in operational status, and when the mobile terminal is in the second physical status, the second antenna system is made to be in operational status.

The mobile terminal composed of the first portion and the second portion is specifically a slide mobile terminal or a folded mobile terminal composed of an upper cover body in which the display screen is provided and a lower cover body in which a host is provided;

The first physical status and the second physical status comprise: an open status and a close status.

An antenna ground unit is provided in the upper cover body, and an antenna radiating unit is provided in the lower cover body.

The first antenna system and the second antenna system share the antenna radiating unit.

The first antenna system and the second antenna system are any two of the following antenna systems respectively: a PIFA antenna system, a monopole system, and an inverted-L shape antenna system.

When the first antenna system and the second antenna system are the PIFA antenna system and the monopole system respectively, the method is specifically:

Detecting the operational statuses of the upper cover body and the lower cover body;

When the upper cover body and the lower cover body are in close status, controlling the antenna radiating unit and the antenna ground unit to form a PIFA antenna system to operate, when the upper cover body and the lower cover body are in open status, controlling the antenna radiating unit to operate as a monopole system.

The step of detecting the operational statuses of the upper cover body and the lower cover body comprises:

Receiving a trigger signal when the upper cover body and the lower cover body change the relative positions;

Determining the operational statuses of the upper cover body and the lower cover body according to the trigger signal.

The step of controlling the antenna radiating unit and the antenna ground unit to form a PIFA antenna system to operate comprises:

Controlling a RF switch to communicate the ground feeding point and the antenna ground unit of the antenna, and communicate a matching circuit and the antenna radiating unit through the antenna feeding point.

The step of controlling the antenna radiating unit to operate as a monopole system comprises:

Controlling the RF switch to disconnect the connection of the ground feeding point and the antenna ground unit of the antenna, and communicate the matching circuit and the antenna radiating unit through the antenna feeding point.

A mobile terminal, comprising:

A first portion and a second portion connected with the first portion, the mobile terminal is made to have a first physical status and a second physical status according to the difference of the relative positions of the first portion and the second portion;

A first antenna system and a second antenna system for radiating signals respectively;

A detecting unit connected with the first portion and the second portion for detecting the physical status of the mobile terminal;

A switching unit connected with the detecting unit, the first antenna system and the second antenna system for making the first antenna system be in operational status when the mobile terminal is in the first physical status and making the second antenna system be in operational status when the mobile terminal is in the second physical status.

The mobile terminal composed of the first portion and the second portion is specifically a slide mobile terminal or a folded mobile terminal composed of an upper cover body in which the display screen is provided and a lower cover body in which a host is provided;

The first physical status and the second physical status comprise: an open status and a close status;

An antenna ground unit is provided in the upper cover body, and an antenna radiating unit is provided in the lower cover body, the first antenna system the second antenna system share the antenna radiating unit;

The first antenna system and the second antenna system are any two of the following antenna systems respectively: a PIFA antenna system, a monopole system, and an inverted L shape antenna system.

The detecting unit is specifically for detecting the operational statuses of the upper cover body and the lower cover body;

The switching unit is specifically for controlling the antenna radiating unit and the antenna ground unit to form a PIFA antenna system to operate when the upper cover body and the lower cover body are in close status, and controlling the antenna radiating unit to operate as a monopole system when the upper cover body and the lower cover body are in close status.

The detecting unit comprises:

A signal receiving unit for receiving a trigger signal when the upper cover body and the lower cover body change the relative positions;

A status determining unit for determining the operational statuses of the upper cover body and the lower cover body according to the trigger signal.

The switching unit comprises:

A first control unit for controlling a RF switch to communicate the ground feeding point and the antenna ground unit of the antenna and communication matching circuit and the antenna radiating unit through the antenna feeding point when the upper cover body and the lower cover body are in close status;

A second control unit for controlling the RF switch to disconnect the connection of the ground feeding point and the antenna ground unit of the antenna and communicate the matching circuit and the antenna radiating unit through the antenna feeding point when the upper cover body and the lower cover body are in open status.

It can be seen from the technical solutions provided by the embodiments of this application that, the mobile terminal of the embodiments of this application is composed of the first portion and the second portion, the mobile terminal has the first physical status and the second physical status according to the difference of the relative positions of the first portion and the second portion, the mobile terminal comprises the first antenna system and the second antenna system, the first antenna system is made to be in operational status when it is detected that the mobile terminal is in the first physical status, and the second antenna system is made to be in operational status when it is detected that the mobile terminal is in the second physical status. In the embodiments of this application, the mobile terminal operates through a different first antenna system and second antenna system according to the difference of the physical status in which it is, instead of operating through a single antenna system as in the prior art, since different antenna systems are employed in the mobile terminal, the antenna ground unit and the antenna radiating unit can be positioned in different parts of the mobile terminal respectively, it satisfies the demand of the mobile terminal for the height of the antenna while implementing the lightness and thinness of the mobile terminal.

DETAILED DESCRIPTION

In a plurality of embodiments of this application as follows, some provide the antenna system switching method, some provide the mobile terminal.

In order for those skilled in the art to understand the technical solutions of the embodiments of this application better, and for the above object, characteristic and advantage of the embodiments of this application to be more clear, hereinafter the technical solutions of the embodiments of this application are further explained detailedly in combination with the accompanying drawings.

The mobile terminal in the embodiments of this application is structurally composed of a first portion and a second portion, the mobile terminal has a first physical status and a second physical status according to the difference of the relative positions of the first portion and the second portion, and a first antenna system and a second antenna system are further included in the mobile terminal.

Figure 1:
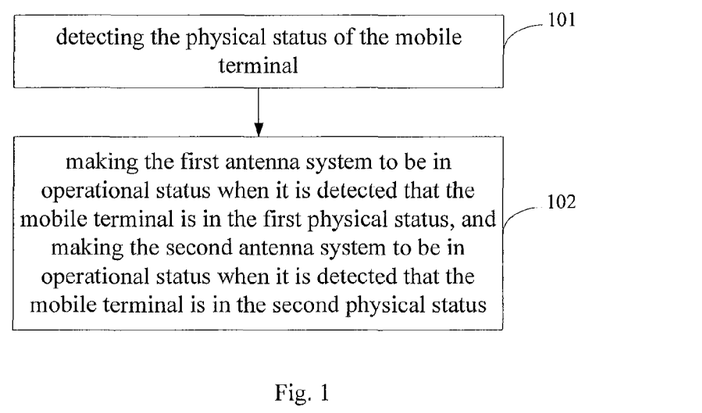
FIG. 1 is a flow chart of the first embodiment of the antenna system switching method of this application.

Referring to FIG. 1, it is a flow chart of the first embodiment of the antenna system switching method of this application:

Step 101: detecting a physical status of the mobile terminal.

The mobile terminal in the embodiment of this application is specifically a folded mobile phone or a slide mobile phone, these two kinds of mobile phone are characterized in that the relative positions between the first portion in which a display screen is provided and the second portion in which a host is provided can change, wherein the first portion in which a display screen is provided is also called an upper cover body of the mobile phone, and the second portion in which a host is provided is also called a lower cover body of the mobile phone. Wherein, the physical status of the slide mobile phone comprises a slide open status and a close status, the physical status of the folded mobile phone comprises an un fold open status and close status. Taking the slide mobile phone as an example, in order to avoid that the antenna ground unit and the antenna radiating unit are provided in the same cover body at the same time so that it is difficult to satisfy the demand of lightness and thinness in the prior art, in the embodiment of this application, the antenna ground unit is provided in the upper cover body, and at the same time the antenna radiating unit is provided in the lower cover body, since the antenna ground unit and the antenna radiating unit are positioned in different cover bodies respectively, the thickness of the entire mobile phone can be reduced.

In the embodiment of this application, the first antenna system and the second antenna system can be provided with independent antenna radiating units respectively, and the first antenna system and the second antenna system can also share the antenna radiating unit.

In the embodiment of this application, the first antenna system and the second antenna system are any two of the following antenna systems respectively: a PIFA antenna system, a monopole system, and an inverted-L shape antenna system.

Step 102: the first antenna system is made to be in operational status when it is detected that the mobile terminal is in the first physical status, and the second antenna system is made to be in operational status when it is detected that the mobile terminal is in the second physical status.

In the embodiment of this application, the mobile terminal composed of the first portion and the second portion can be specifically a slide mobile terminal or a folded mobile terminal composed of the upper cover body in which the display screen is and the lower cover body in which the host is; based on the above mobile terminal, the first physical status and the second physical status thereof can be in the open status and the close status respectively, for the slide mobile terminal, they are specifically a slide open status and a cover close status, for the folded mobile terminal, they are specifically a turn open status and a cover close status. In the mobile terminal with above structure, the antenna ground unit is provided in the upper cover body, the antenna radiating unit is provided in the lower cover body, the first antenna system and the second antenna system can share the antenna radiating unit, since the antenna ground unit and the antenna radiating unit are not in the same cover body, the thickness of the mobile terminal can be reduced, wherein, when the mobile terminal is in the open status, the first antenna system operated can be specifically the PIFA antenna system, when the mobile terminal is in the close status, the second antenna system can be specifically the monopole antenna system.

Figure 2:
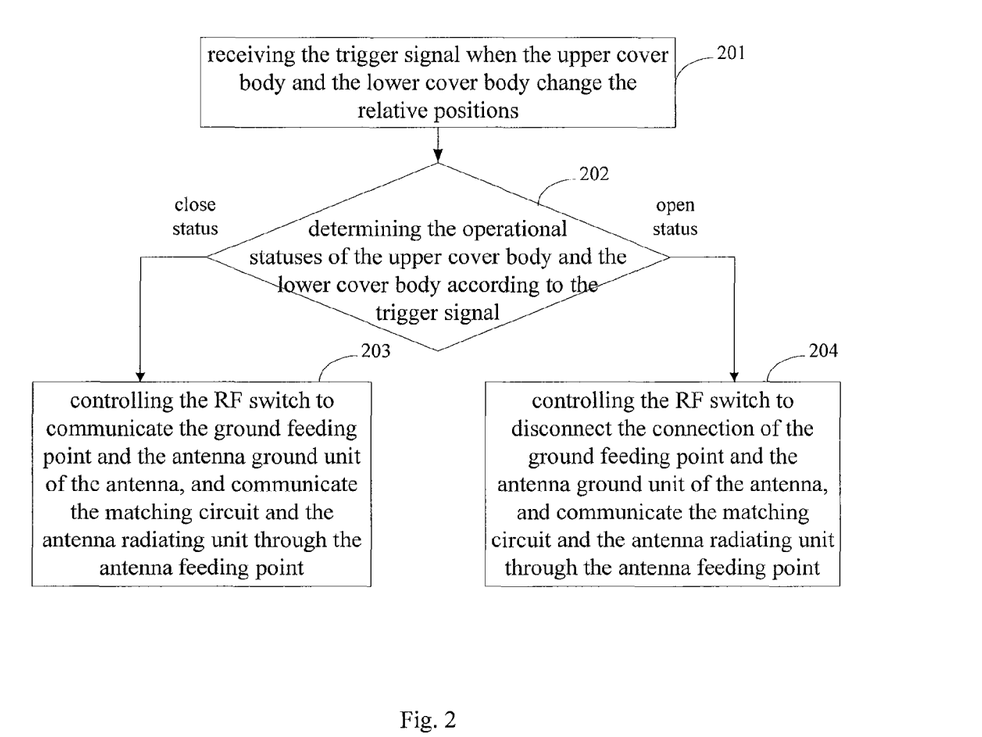
FIG. 2 is a flow chart of the second embodiment of the antenna system switching method of this application.

Referring to FIG. 2, it is a flow chart of the second embodiment of the antenna system switching method of this application, this embodiment takes the slide mobile phone as an example, it describes the procedure of switching of the antenna systems in the mobile phone, wherein, the antenna systems are specifically the PIFA antenna system and the monopole antenna system:

Step 201: receiving a trigger signal when the upper cover body and the lower cover body change the relative positions.

Step 202: determining the operational statuses of the upper cover body and the lower cover body according to the trigger signal, if it is the close status, step 203 is executed; and if it is the open status, step 204 is executed.

Step 203: controlling a RF switch to communicate the ground feeding point and the antenna ground unit of the antenna, and communicate the matching circuit and the antenna radiating unit through the antenna feeding point, finishing the current flow.

The antenna radiating unit and the antenna ground unit form the PIFA antenna system to operate at this time.

Step 204: controlling the RF switch to disconnect the connection of the ground feeding point and the antenna ground unit of the antenna, and communicate the matching circuit and the antenna radiating unit through the antenna feeding point, finishing the current flow.

The antenna radiating unit operates as the monopole antenna system at this time.

Figure 3A:
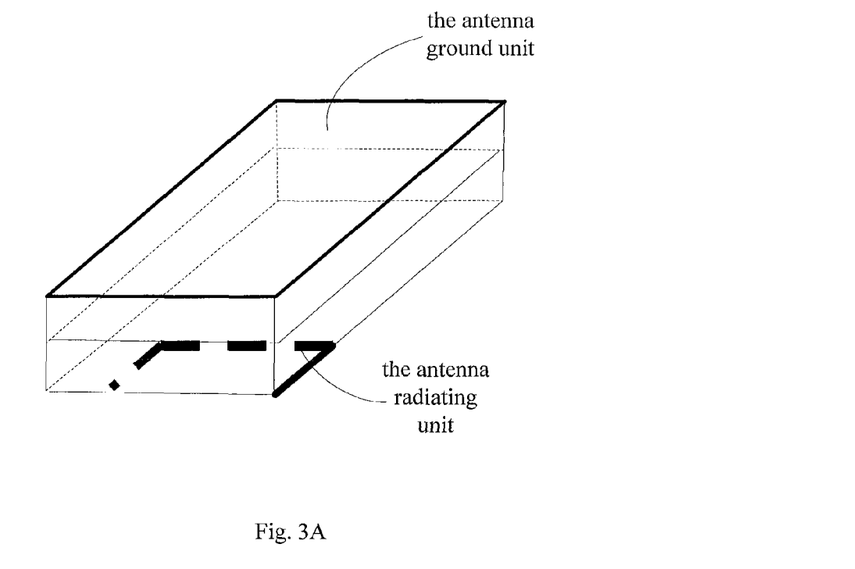
FIG. 3A is a schematic view of the status when a slide mobile phone applying the embodiment of this application closes.
Figure 3B:
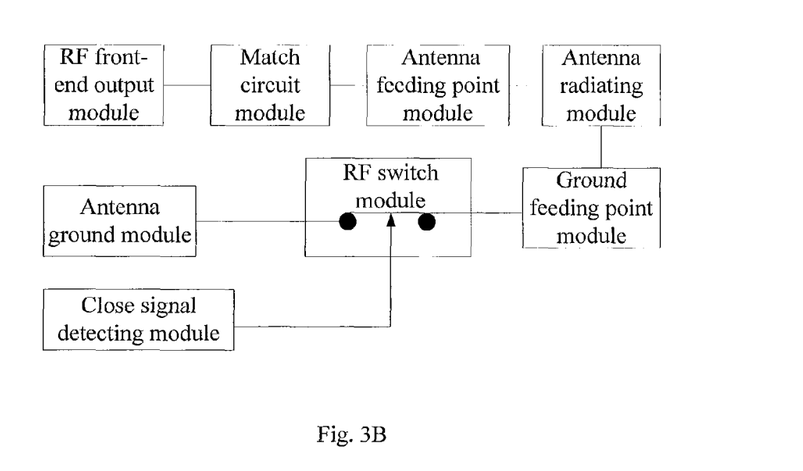
FIG. 3B is a schematic view of the structure of the PIFA antenna system in a slide mobile phone applying the embodiment of this application.

Referring to FIG. 3A and FIG. 3B, wherein FIG. 3A is a schematic view of the status when a slide mobile phone applying the embodiment of this application closes, FIG. 3B is a schematic view of the structure of the PIFA antenna system in a slide mobile phone applying the embodiment of this application:

It is known from FIG. 3A that, the slide mobile phone is in the close status at this time, wherein, the antenna ground unit is provided in the upper cover body of the slide mobile phone, the antenna radiating unit is provided in the lower cover body of the slide mobile phone, thus the thickness of the upper cover body is used so that the height of antenna between the antenna ground unit and the antenna radiating unit is easy to satisfy the demand of 8 to 9 mm, and the thickness of the entire slide mobile phone only needs 10 to 11 mm, not as that the thickness of the upper cover body or the lower cover body would need to reach 10 to 11 mm in the prior art. In the close status, the antenna ground unit and the antenna radiating unit form the PIFA antenna system to operate.

The slide mobile phone operates in the PIFA antenna system in FIG. 3B, wherein, a RF front-end output module is connected with the antenna radiating module through a matching circuit module, also there is connection through the antenna feeding point between the matching circuit module and the antenna radiating module, the antenna ground module is connected to the antenna radiating module through a RF switch module, a ground feeding point module is provided between the RF switch module and the antenna radiating module. In the procedure of operation, when a close signal detecting module detects that the slide mobile phone is in the close status, the RF switch is controlled to close, the antenna ground module and the antenna radiating module form the PIFA antenna system to operate through the RF switch module at this time. When the PIFA antenna system operates, the antenna ground feeding point module is set according to the impedance characteristic of the antenna, so that the impedance of the antenna reaches 50 ohm, the selection of an appropriate position of the antenna ground feeding point can be implemented by an simulated computation, this is in consistent with the prior art and no more details repeated.

Figure 4A:
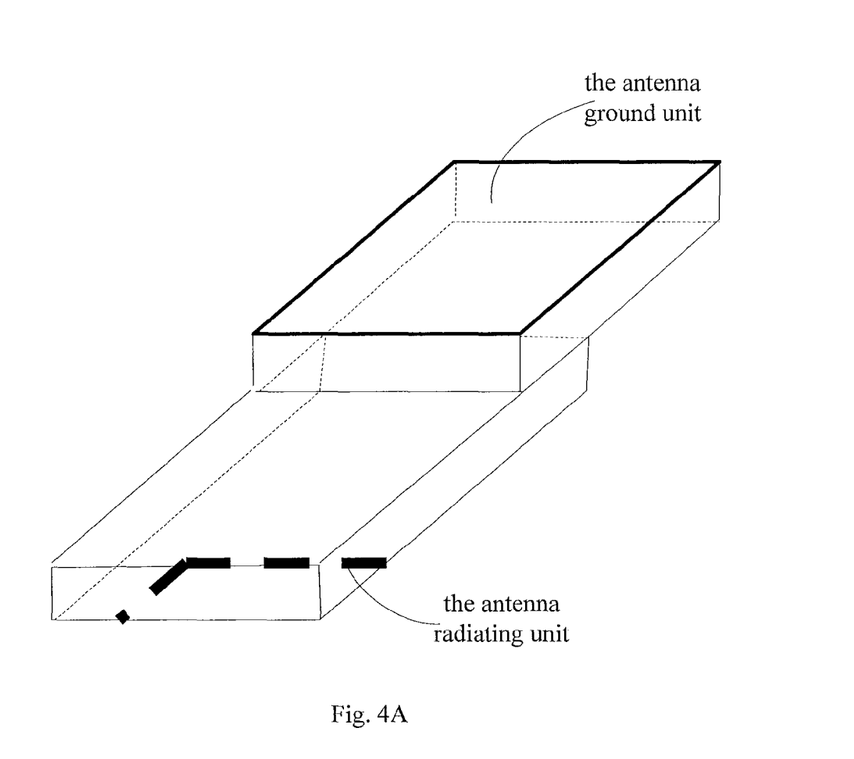
FIG. 4A is a schematic view of the status when a slide mobile phone applying the embodiment of this application slides.
Figure 4B:
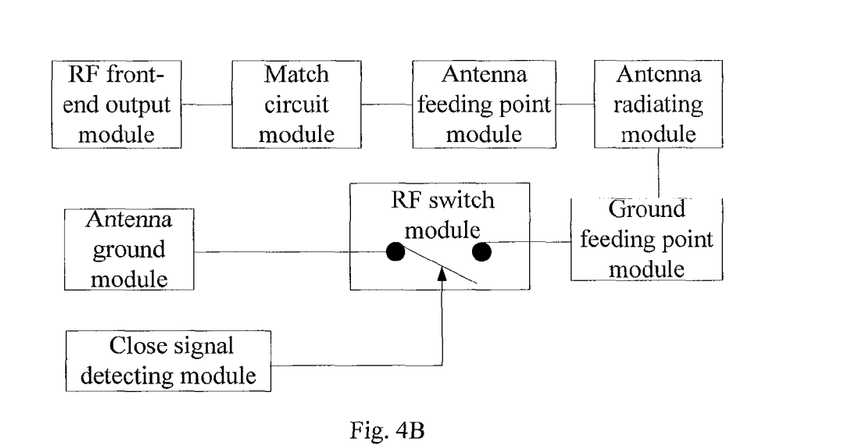
FIG. 4B is a schematic view of the structure of the monopole antenna system in a slide mobile phone applying the embodiment of this application.

Referring to FIG. 4A and FIG. 4B, wherein, FIG. 4A is a schematic view of a status when a slide mobile phone applying the embodiment of this application slides, and FIG. 4B is a schematic view of the structure of the monopole antenna system in a slide mobile phone applying the embodiment of this application:

It is known from FIG. 4A that, the slide mobile phone is in the open status at this time, wherein, the antenna ground unit is provided in the upper cover body of the slide mobile phone, the antenna radiating unit is provided in the lower cover body of the slide mobile phone, since the antenna radiating unit and the antenna ground unit are not connected at this time, the antenna radiating unit forms the monopole antenna system to operate in the open status.

The slide mobile phone operates in the monopole antenna system in FIG. 4B, the antenna ground unit provided in the upper cover body of the slide mobile phone is far from the antenna radiating unit in the lower cover body at this time, a headroom condition is reached around the antenna, i.e., there are no metallic media within 10 mm around the antenna, the antenna operates in a monopole status, the monopole antenna is an antenna composed of straight conductor mounted perpendicularly directly on a reflection plane (i.e., a bottom surface of the lower cover body), the root thereof is connected with a feed line. When the slide mobile phone enters the open status from the close status, when the close signal detecting module detects that the slide mobile phone is in the open status, the RF switch is controlled from close to open, the antenna ground unit and the ground feeding point module is not connected at this time, the antenna ground unit and the antenna radiating unit can not form the PIFA antenna system to operate, instead, the connection between the matching circuit and the antenna radiating unit is maintained by the antenna feeding point module to form the monopole antenna system to operate.

Corresponding to the embodiments of the antenna system switching method of this application, this application further provides embodiments of the mobile terminal.

Figure 5:
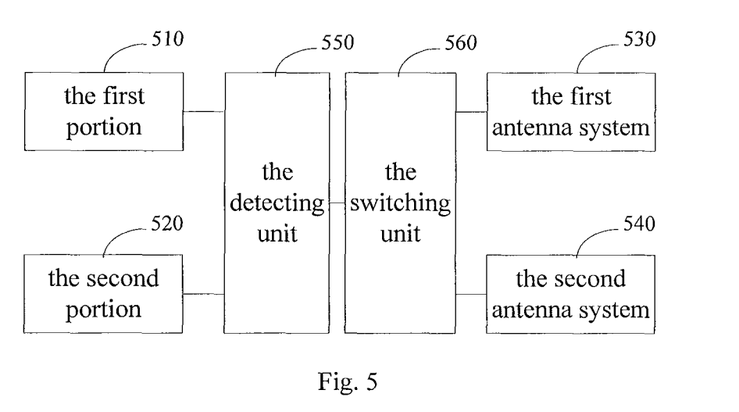
FIG. 5 is a block view of the mobile terminal of the embodiment of this application.

Referring to FIG. 5, it is a block view of the mobile terminal of the embodiment of this application.

The mobile terminal comprises: a first portion 510, a second portion 520, a first antenna system 530, a second antenna system 540, a detecting unit 550 and a switching unit 560.

Wherein, the first portion 510 and the second portion 520 are connected, the mobile terminal is made to have a first physical status and a second physical status according to the difference of relative positions of the first portion 510 and the second portion 520;

The first antenna system 530 and the second antenna system 540 are for radiating signals respectively;

the detecting unit 550 is connected with the first portion 510 and the second portion 520 for detecting the physical status of the mobile terminal;

The switching unit 560 is connected with the detecting unit 550, the first antenna system 530 and the second antenna system 540 for making the first antenna system 530 be in operational status when the mobile terminal is in the first physical status and making the second antenna system 540 be in operational status when the mobile terminal is in the second physical status.

The above mobile terminal composed of the first portion 510 and the second portion 520 can be specifically a slide mobile terminal or a folded mobile terminal composed of an upper cover body in which a display screen is and a lower cover body in which a host is; the above first physical status and second physical status comprise an open status and a close status. Specifically, an antenna ground unit is provided in the upper cover body, an antenna radiating unit is provided in the lower cover body; the first antenna system and the second antenna system can share the antenna radiating unit, and can also be provided with independent antenna radiating unit respectively; the first antenna system and the second antenna system are any two of the following antenna system respectively: a PIFA antenna system, a monopole antenna system and an inverted-L shape antenna system.

The detecting unit 550 is specifically for detecting the operational statuses of the upper cover body and the lower cover body;

The switching unit 560 is specifically for controlling the antenna radiating unit and the antenna ground unit to form the PIFA antenna system to operate when the upper cover body and the lower cover body are in the close status, and controlling the antenna radiating unit to operate as the monopole antenna system when the upper cover body and the lower cover body are in the open status.

Specifically, the detecting unit 550 can comprise (not illustrated in FIG. 5): a signal receiving unit for receiving a trigger signal when the upper cover body and the lower cover body change the relative positions; a status determining unit for determining the operational statuses of the upper cover body and the lower cover body according to the trigger signal.

Specifically, the switching unit may comprise (not illustrated in FIG. 5): a first control unit for controlling a RF switch to communicate a ground feeding point and the antenna ground unit of the antenna and communicate a matching circuit and the antenna radiating unit through an antenna feeding point when the upper cover body and the lower cover body are in the close status; a second control unit for controlling the RF switch to disconnect the connection of a ground feeding point and the antenna ground unit of the antenna and communicate the matching circuit and the antenna radiating unit through the antenna feeding point when the upper cover body and the lower cover body are in the open status.

It can be seen from the description of the above embodiments, the mobile terminal of the embodiments of this application is composed of the first portion and the second portion, the mobile terminal has the first physical status and the second physical status according to the difference of the relative positions of the first portion and the second portion, the mobile terminal comprises the first antenna system and the second antenna system, the first antenna system is made to be in the operational status when it is detected that the mobile terminal is in the first physical status, and the second antenna system is made to be in the operational status when it is detected that the mobile terminal is in the second physical status. In the embodiments of this application, the mobile terminal operates through a different first antenna system and second antenna system according to the difference of the physical status in which it is, instead of operating through a single antenna system as in the prior art, since different antenna systems are employed in the mobile terminal, the antenna ground unit and the antenna radiating unit can be positioned in different parts of the mobile terminal respectively, it satisfies the demand of the mobile terminal for the height of the antenna while implementing the light and thin of the mobile terminal.

Those skilled in the art can understand clearly that the technology in the embodiments of this application can be implemented by means of software with necessary general hardware platforms. Based on such understanding, the technical solutions in the embodiments of this application essentially or the parts contributed to the prior art can be embodied in the form of a software product, the computer software product can be stored in a storage medium, such as ROM/RAM, magnetic disc, optical disk or the like, it comprises some instructions to cause a computer equipment (which may be a personal computer, a server or a network equipment or the like) to execute the method according to the respective embodiments or certain parts of the embodiments of this application.

The respective embodiments in this specification are described in a stepwise way, the same or similar parts between the respective embodiments can be referred to with each other, the emphasized explanations of the respective embodiments are the difference from other embodiments. Especially, for the system embodiments, since they are substantially similar to the method embodiments, the description is comparative simple, and relevant part can be referred to the explanation part of the method embodiments.

The above embodiments of this application are not restriction to the protective scope of this application. Any modification, equivalent alternation or improvement or the like within the spirits and principles of this application should be included in the protective scope of this application.

What is claimed is:

1. An antenna system switching method applied to a mobile terminal composed of a first portion and a second portion, the mobile terminal has a first physical status and a second physical status according to the difference of the relative positions of the first portion and the second portion, wherein, the mobile terminal comprises a first antenna system and a second antenna system, the method comprises:
    detecting the physical status of the mobile terminal;
    making the first antenna system be in operational status when the mobile terminal is in the first physical status, and making the second antenna system be in operational status when the mobile terminal is in the second physical status; and
    disconnecting a connection of a ground feeding point and an antenna ground unit of the antenna to control an antenna radiating unit to operate as a monopole antenna system when the mobile terminal is in the second physical status, wherein the antenna ground unit is provided in the first portion and the antenna radiating unit is provided in the second portion.

2. The method according to claim 1, wherein, the mobile terminal composed of the first portion the second portion is specifically: a slide mobile terminal or a folded mobile terminal composed of an upper cover body in which a display screen is and a lower cover body in which a host is; and
    the first physical status and the second physical status comprise: an open status and a close status.

3. The method according to claim 2, wherein the antenna ground unit is provided in the upper cover body, and the antenna radiating unit is provided in the lower cover body.

4. The method according to claim 3, wherein, when the first antenna system and the second antenna system are a PIFA antenna system and the monopole antenna system respectively, the method comprises:
    detecting the operational statuses of the upper cover body and the lower cover body; and
    controlling the antenna radiating unit and the antenna ground unit to constitute the PIFA antenna system to operate when the upper cover body and the lower cover body are in the close status, and controlling the antenna radiating unit to operate as the monopole antenna system when the upper cover body and the lower cover body are in the open status.

5. The method according to claim 4, wherein, the operational statuses of the upper cover body and the lower cover body comprise:
    receiving a trigger signal when the upper cover body and the lower cover body change the relative positions; and
    determining the operational statuses of the upper cover body and the lower cover body according to the trigger signal.

6. The method according to claim 4, wherein, the step of controlling the antenna radiating unit and the antenna ground unit to form the PIFA antenna system to operate comprises:
    controlling an RF switch to communicate the ground feeding point and the antenna ground unit of the antenna, and to communicate a matching circuit and the antenna radiating unit through an antenna feeding point.

7. The method according to claim 4, wherein, the step of controlling the antenna radiating unit to operate as the monopole antenna system comprises:
    controlling the RF switch to disconnect the connection of the ground feeding point and the antenna ground unit of the antenna, and communicate the matching circuit and the antenna radiating unit through the antenna feeding point.

8. The method according to claim 1, wherein, the first antenna system and the second antenna system share the antenna radiating unit.

9. The method according to claim 1, wherein, the first antenna system and the second antenna system are respectively any two of the following antenna system: a PIFA antenna system, the monopole antenna system and an inverted-L shape antenna system.

10. A mobile terminal, comprising:
    a first portion and a second portion connected with the first portion, the mobile terminal being made to have a first physical status and a second physical status according to the difference of the relative positions of the first portion and the second portion;
    a first antenna system and a second antenna system, the first antenna system and the second antenna system being used to radiate signals respectively;
    a detecting unit connected with the first portion and the second portion for detecting the physical status of the mobile terminal; and
    a switching unit connected with the detecting unit, the first antenna system and the second antenna system for making the first antenna system be in operational status when the mobile terminal is in the first physical status and making the second antenna system be in operational status when the mobile terminal is in the second physical status,
    wherein an antenna ground unit is provided in the first portion and an antenna radiating unit is provided in the second portion and the switching unit disconnects a connection of a ground feeding point and the antenna ground unit of the antenna to control the antenna radiating unit operate as a monopole antenna system when the mobile terminal is in the second physical status.

11. The mobile terminal according to claim 10, wherein, the mobile terminal composed of the first portion the second portion is specifically: a slide mobile terminal or a folded mobile terminal composed of an upper cover body in which a display screen is and a lower cover body in which a host is;
    the first physical status and the second physical status comprise: an open status and a close status;
    the antenna ground unit is provided in the upper cover body, and the antenna radiating unit is provided in the lower cover body, the first antenna system the second antenna system share the antenna radiating unit; and
    the first antenna system and the second antenna system are any two of the following antenna systems respectively: a PIFA antenna system, the monopole system, and an inverted L shape antenna system.

12. The mobile terminal according to claim 11, wherein,
    the detecting unit detects the operational statuses of the upper cover body and the lower cover body; and
    the switching unit controls the antenna radiating unit and the antenna ground unit to form the PIFA antenna system to operate when the upper cover body and the lower cover body are in the close status, and controlling the antenna radiating unit to operate as the monopole system when the upper cover body and the lower cover body are in the close status.

13. The mobile terminal according to claim 12, wherein, the detecting unit comprises:
- a signal receiving unit for receiving a trigger signal when the upper cover body and the lower cover body change the relative positions; and
- a status determining unit for determining the operational statuses of the upper cover body and the lower cover body according to the trigger signal.

14. The mobile terminal according to claim 12, wherein, the switching unit comprises:
- a first control unit for controlling a RF switch to communicate the ground feeding point and the antenna ground unit of the antenna and communicate a matching circuit and the antenna radiating unit through an antenna feeding point when the upper cover body and the lower cover body are in the close status; and
- a second control unit for controlling the RF switch to disconnect the connection of the ground feeding point and the antenna ground unit of the antenna and communicate the matching circuit and the antenna radiating unit through the antenna feeding point when the upper cover body and the lower cover body are in the open status.

\* \* \* \* \*